(12) United States Patent
Doron

(10) Patent No.: US 7,158,262 B2
(45) Date of Patent: Jan. 2, 2007

(54) MULTI-LEVEL ERROR DIFFUSION APPARATUS AND METHOD OF USING SAME

(75) Inventor: Amir Doron, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 216 days.

(21) Appl. No.: 10/979,690

(22) Filed: Nov. 1, 2004

(65) Prior Publication Data

US 2005/0057777 A1    Mar. 17, 2005

Related U.S. Application Data

(63) Continuation of application No. 09/506,172, filed on Feb. 17, 2000, now abandoned.

(51) Int. Cl.
*H04N 1/407* (2006.01)
*H04N 1/60* (2006.01)

(52) U.S. Cl. .................... 358/3.03; 358/521

(58) Field of Classification Search ...... 358/3.03–3.06, 358/3.21–3.22, 1.9, 534–536, 518, 521; 382/167, 382/252
See application file for complete search history.

(56) References Cited

U.S. PATENT DOCUMENTS

| | | | |
|---|---|---|---|
| 5,243,443 A | 9/1993 | Eschbach | |
| 5,434,672 A | 7/1995 | McGuire | |
| 5,970,178 A | 10/1999 | Lin | |
| 5,982,992 A | 11/1999 | Waldron | |
| 6,068,361 A | 5/2000 | Mantell | |
| 6,330,075 B1 | 12/2001 | Ishikawa | |

*Primary Examiner*—Scott A. Rogers

(57) ABSTRACT

A multi-level error diffusion system includes a processor that creates an m by n super pixel cell as an output pixel value for individual ones of a plurality of single input pixel values that are indicative of an image. The processor assigns to individual ones of the m by n super pixel cells available printer output color values, where the average of the assigned output values are selected to be as close as possible to corresponding individual one of the single input pixel values. A multi-level printer receives the individual ones of the m by n super pixel cells having assigned output values and converts them into printer data to form a printed image.

2 Claims, 2 Drawing Sheets

MULTI-LEVEL ERROR DIFFUSION APPARATUS AND METHOD OF USING SAME

CROSS REFERENCE TO RELATED APPLICATION(S)

This application is a continuation of U.S. application Ser. No. 09/506,172, Multi-level Error Diffusion Apparatus And Method Of Using Same, filed Feb. 17, 2000 now abandoned.

TECHNICAL FIELD

The present invention relates to a multi-level inkjet printer and a method of using the same. More particularly, the present invention relates to a multi-level error diffusion apparatus and method of using the apparatus to significantly reduce the average error value that must be diffused.

BACKGROUND

Thermal inkjet technology printing involves depositing a number of overlapping dots of the same color ink or different color ink on a medium sheet to form a pixel. As one example, a four color ink printer printing any combination of cyan, magenta, yellow, and black dots for a pixel position with, at most, one dot per color for a single pixel position can produce 16 different colors for a single pixel position without half-toning. If multiple drops of the same color ink can be utilized when creating a color spot, the possible color combinations without half toning is greatly increased.

Modern day thermal inkjet printers are capable of producing hardcopy reproductions of displayed image data utilizing sophisticated error diffusion techniques, such as the Floyd and Steinberg technique. See, for example, Floyd, R. W. and Steinberg. A L.; "An Adaptive Algorithm For Spatial Gray Scale, AA"SID 75 Digest; Society for Information Display 1975, at pages 36–37. See also, Meyer, J. D. Dispoto, G. J., and Mather, L. R.; U.S. Pat. No.: 4,680,645 entitled "Multiple Level Error Diffusion" as well as McGuire, M. D. U.S. Pat. No.: 5,434,672 entitled "Pixel Error Diffusion Method."

The McGuire, M. D. patent (U.S. Pat. No. 5,434,672) discloses an error distribution scheme based on the teachings of the Floyd and Steinberg technique. More particularly, the McGuire patent teaches that error diffusion is accomplished by combined super-pixel error diffusion with intra-super-pixel error diffusion among subject pixels within a selected super-pixel. Super-pixel representations of a physical image are processed for subsequent presentation by diffusing error values derived by taking differences between input and output portions of the physical image being processed, and the error values are diff-used with respect to a selected super-pixel of predetermined dimensioning and residing in a predetermined super-pixel neighborhood, and further with respect to selected subject pixels within the selected super-pixel, each of them being subject pixels within the selected super-pixel and having an assigned error value.

In one embodiment, McGuire teaches to diffuse contributions of the error of a selected subject pixel in a selected super-pixel to selected neighboring super-pixels, according to a desired fractional distribution scheme. That is, the selected subject pixel within the selected super-pixel will have had its error established according to an error distribution scheme accomplished among individual subject pixels within the selected super-pixel. According to one such internal error distribution scheme, error diffusion is accomplished among all or a selected subset of the subject pixels within the selected super-pixel. In accordance with an error diffusion scheme internal to the super-pixel, the entire error of a pixel within a super-pixel is provided to a next pixel and so on until a determined or selected subject pixel within the super-pixel produces a final error value for the super-pixel which is then distributed fractionally or otherwise among selected or predetermined adjacent super-pixels and to some or each of the subject pixels within each such selected neighboring super-pixels.

While such an error diffusion scheme minimizes visual artifacts which commonly appear in an output presentation printer, it would nevertheless be highly desirable to have a new and improved error diffusion apparatus and method that significantly reduces the average error values associated with converting from one color space to another color space.

Digressing for a moment, error diffusion is a half toning algorithm for converting from N level display data to M level printer data where N is substantially greater than M. For example, if a display source image device is capable of display 24-bits of RGB data an associated printer would need to output $2^8$ or 256 different levels of each color to exactly reproduce the display source image data. Since most printers are incapable of producing such a large number of different color levels for each color, the display source image data must be half toned before printing. Error diffusion is a way of half toning the display image data. In summary then, error diffusion selects the closest possible level out of the available levels, and passes the error onto the neighboring pixels.

A typical error diffusion scheme can be illustrated with the following example: assuming an input display device has the capability of displaying 16 levels per pixel color and that an associated printer is capable of only producing four equally spaced levels per pixel color. The error associated with each display color when converted to the printer color space can be illustrated or shown in Table I.

TABLE I

| $V_{in}$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $V_o$ | 0 | 0 | 0 | 0 | 5 | 5 | 5 | 5 | 10 | 10 | 10 | 10 | 15 | 15 | 15 | 15 |
| $V_e$ | 0 | -1 | -2 | -3 | 1 | 0 | -1 | -2 | 2 | 1 | 0 | -1 | -3 | 2 | 1 | 0 |

From Table I, an average error value can be computed in accordance with equation 1 to arrive at an average error value of 1.25 as follows:

$$20/16 = 1.25 \qquad \text{Equation 1}$$

While such a error value in a typical error diffusion scheme may be acceptable for many application, it would be highly desirable to have a new and improved error diffusion algorithm and apparatus that greatly reduces the average error value in an error diffusion scheme.

SUMMARY OF THE INVENTION

A multi-level error diffusion system includes a processor that creates an m by n super pixel cell as an output pixel value for individual ones of a plurality of single input pixel values that are indicative of an image. The processor assigns to individual ones of the m by n super pixel cells available printer output color values, where the average of the assigned output values are selected to be as close as possible to corresponding individual one of the single input pixel values. A multi-level printer receives the individual ones of the m by n super pixel cells having assigned output values and converts them into printer data to form a printed image.

BRIEF DESCRIPTION OF THE DRAWINGS

The above mentioned features of the present invention and the manner of attaining them will become apparent and the invention itself will be best understood by reference to the following description of the preferred embodiment of the invention, in conjunction with the accompanying drawings, wherein.

DETAILED DESCRIPTION OF THE PREFERRED EMBODIMENT

Figure 2:
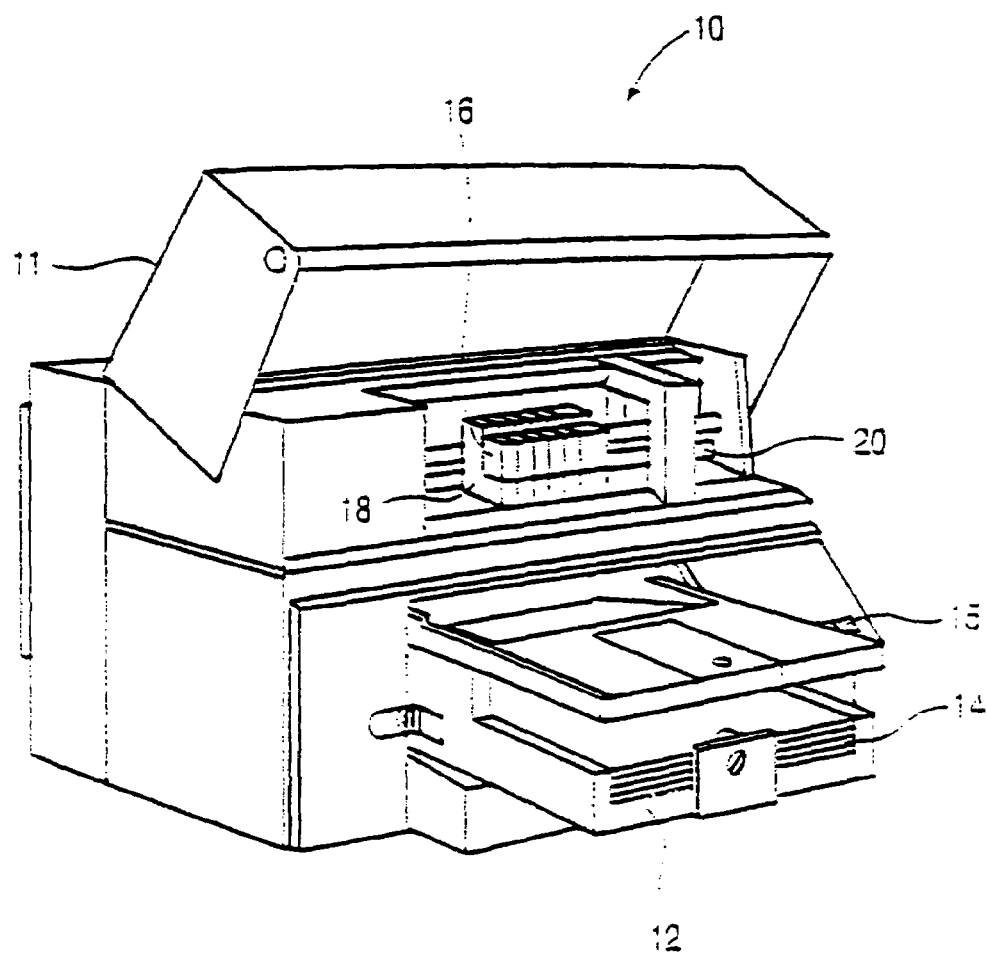
FIG. 2 is a diagrammatic illustration of an inkjet printer that forms part of the error diffusion system of FIG. 1.
Figure 1:
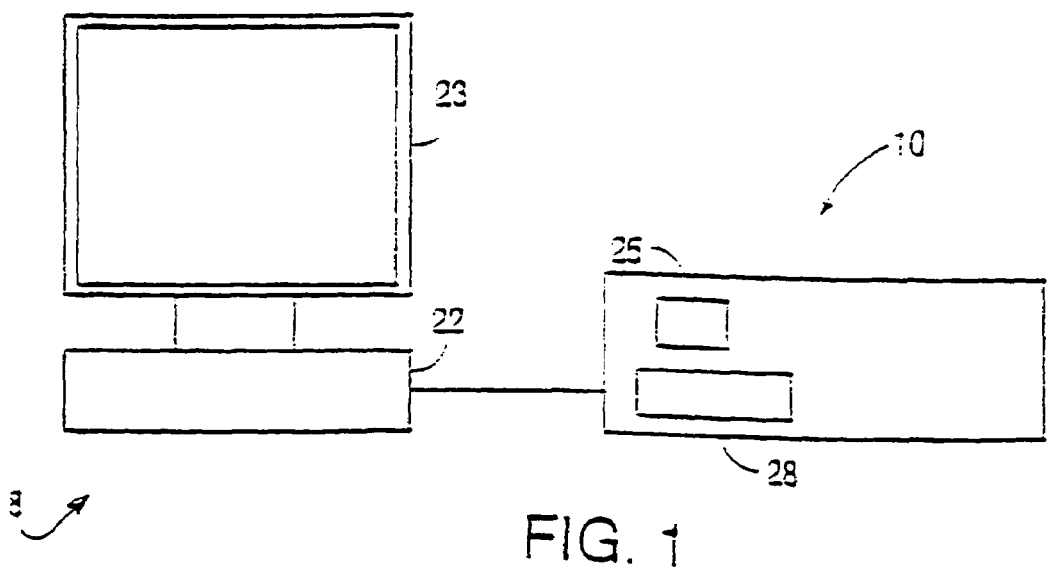
FIG. 1 is a diagrammatic illustration of error diffusion system which is constructed in accordance with the present invention.

Referring now to the drawings and more particularly to FIGS. 1–2 thereof there is shown an error diffusion system 8 which is constructed in accordance with the present invention. The error diffusion system 8 enables the color space of another output device, such as a display monitor 23, to be converted into the color space of a multi-level inkjet printer, such as the inkjet printer 10 as illustrated in FIG. 2.

Considering now the error diffusion system 8 in greater detail, the error diffusion system 8 generally includes processing circuitry in the form of hardware and software for performing all or part of the error diffusion method described herein. In this regard, the error diffusion system 8 comprises a host computer 22 having coupled thereto a color monitor 23 for providing an Red, Green, Blue (RGB) color space continuum and the inkjet printer 10 for providing a Cyan, Magenta, Yellow, Black (CYMK) color space continuum.

As best seen in FIG. 2, the inkjet printer 10 includes a cover 11, a paper tray 12 for holding a supply of input medium, an output tray 15 for receiving individual medium sheets that have received deposited droplets of ink, a set 16 of color ink print cartridges, and a scanning carriage 18 that travels along a rectilinear path of travel defined by a slide bar 20. The scanning carriage 18 holds the set 16 of print cartridges in a proper orientation relative to individual ones of the medium sheets as they pass through a print zone within the printer 10.

The inkjet printer 10 also includes a printer controller 28 that receives coded signals from the computer 22 and that provides firing signals to cause the set 16 of ink cartridges to eject drops of ink on the medium as it passes through the print zone of the printer 10. The set 16 of print cartridges may print at 300 dots-per-inch (DPI), 600 dpi, or any other convenient resolution. It should be noted by those skilled in the art that the printer 10 is a multi-level inkjet printer where multiple drops of the same color ink are deposited over the same pixel or dot position on a medium sheet as it passes through the print zone. In this regard, the scanning carriage 18 holding the set 16 of print cartridges may make multiple scans across the medium to print such overlapping dots.

In one embodiment, the set 16 of color print cartridges includes a light cyan ink cartridge 30, a dark cyan ink cartridges 32, a light magenta ink cartridge 34, a dark magenta ink cartridge 36, a yellow ink cartridge 38, and a black ink cartridge 40. Other combinations of ink cartridges, such as a more traditional cyan, magenta, yellow, black combination or a cyan, magenta, yellow combination, may also be utilized. Further, a separate print cartridge need not be provided for each color ink, a single replaceable print cartridge may include two or more colors or ink with an associated array of ink ejection nozzles for each color. Also, the ink supply for each of the scanning printheads may be stationary and connected to the printheads by a tube. Inkjet print cartridges and inkjet printers are well known to those of ordinary skill in the art. U.S. Pat. No. 5,594,481, entitled "Ink Channel Structure for Inkjet Printhead," to Brian J. Keefe et al., describes the structure of a suitable inkjet print cartridge.

Considering now the operation of the error diffusion system 8 in greater detail, the operation of the error diffusion system 8 begins with the computer 22 generating image signals that cause the display on an RGB color image on the monitor 23. In this regard, a monitor driver not shown converts computer image data into color image data that facilitates the display of an RGB color image on the monitor 23.

When a user (not shown) desires to print a hardcopy of the RGB image displayed on the monitor 23, the user causes a print command to be initiated, which in turn causes the processing circuitry and firmware that is the form of hardware and software disposed in the computer 22 and the printer 10 to convert the computer image data displayed on the monitor 23 into CMYK printer data. The location of the processing circuitry, firmware and software, whether in the computer 22, the printer 10 or partially in the computer 22 and partially in the printer 10 is a matter of design choice.

Figure 3:
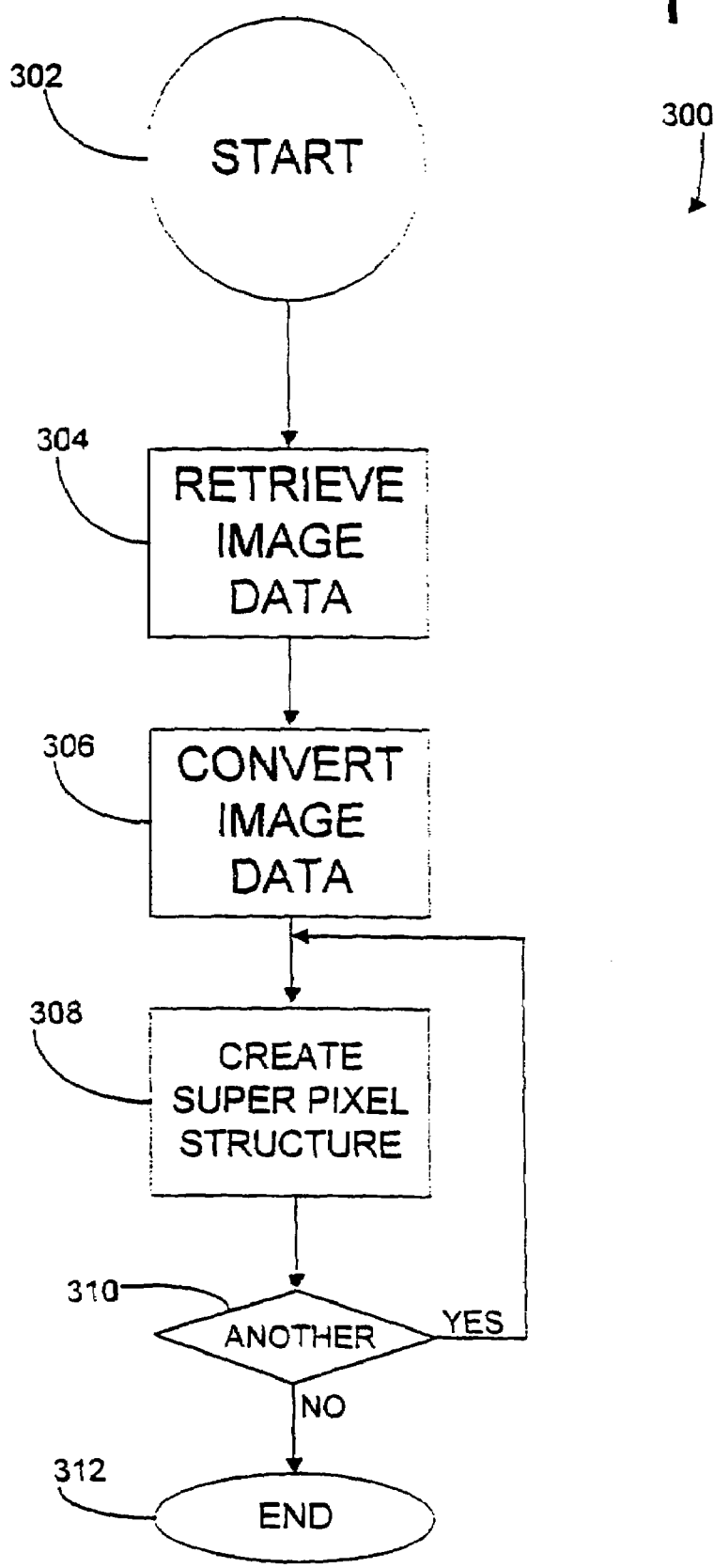
FIG. 3 is a high level flowchart illustrating the basis steps in a half toning process in accordance with the present invention.

The general method carried out by the error diffusion system 8 is illustrated in the flowchart of FIG. 3. Details of the operational steps will now be described in greater detail. It is assumed in the flowchart of FIG. 3, that the RGB image to be printed by the printer 10 is first generated in the personal computer 22 and displayed on the monitor 23. It should be understood by those skilled in the art however, that the data for displaying the RGB image may be generated by other means and need not be displayed to be converted into printer color space data.

Referring now to the flowchart of FIG. 3, the operation of the error diffusion system 8 begins at a start step 302 when a print command is received by the computer 22. The system then proceeds to a retrieve step 304 that causes the computer data stored in the memory system of the computer 22 to be retrieved. In this regard, a typical computer generates signals for a monitor to display the additive primary colors, red, green and blue (RGB), which can be combined to produce millions of colors and also black. Typically there are 256 levels of intensity for each primary color, such that each of the primary colors may be identified utilizing an 8-bit byte. A typical computer monitor displays images at 75 dots per inch. The 24-bit RGB color image is held in the memory of the computer 22 so that an image can be displayed when required on the monitor 23.

After the display data is retrieved from the computer memory, the system advances to a convert step 306 that causes the retrieved image data to be converted to 24-bit RGB image data at the resolution of the printer 10. As mentioned earlier, the multi-level printer 10 may have a resolution of 300 dpi, 600 dpi, or even 1200 dpi. Although a printer typically prints in CYM or CYMK subtractive colors, it is nevertheless convenient for image processing purposes in step 306 to consider the printer to be an RGB device. This conversion also performs color correction to compensate for the CYMK ink colors and the inherent limitations of printing colors with ink. For example, some RGB colors on a monitor cannot be printed, so these RGB colors must be mapped to the closest color that can be printed. Such resolution conversion and color correction to best match the monitor color to a printed color is known in the art. Other techniques may be employed to instead directly convert the RGB coded image to a CMYK coded image.

After converting each pixel value to a single 24-bit RGB image data value at the resolution of the printer 10, the system proceeds to a super-pixel conversion step 308 that converts each single 24-bit RGB image data value to an m by n super-pixel CMYK color space value utilizing X equally spaced colors as will be described hereinafter in greater detail. After converting a present input values, the system advances to a decision step 310 to determine whether another input values needs to be converted.

If another input value needs to be converted the system returns to step 308 to convert another input value. This conversion process continues until each input value of the 24-bit RGB image data has been converted to a super-pixel value. The system then proceeds to a command step 312 that causes the output values to be diffused during the printing process. Once the image has been printed, the system exits at an exit step 314 to wait for another print command.

Considering now the conversion step 308 in greater detail, the use of a super-pixel reduces the average error value of pixels. In short, by creating an m by n cell super pixel as an output form from each single input pixel, and then filling the output super-pixel with the output values numbers of from the X number of available output color values where the selected values are made as close as possible to the input values a significant reduction in the average error value results. Thus, for example, Table II illustrates an 3-bit RGB conversion process into 4 equally spaced color values.

TABLE II

| $V_{in}$ | 0 | | 1 | | 2 | | 3 | | 4 | |
|---|---|---|---|---|---|---|---|---|---|---|
| $V_o$ | 0 | 0 | 0 | 5 | 0 | 0 | 5 | 0 | 5 | 5 |
|       | 0 | 0 | 0 | 0 | 5 | 0 | 0 | 5 | 0 | 5 |
| $V_{ave}$ | 0 | | 1.25 | | 1.25 | | 2.5 | | 3.75 | |
| $V_{err}$ | 0 | | 0.25 | | −0.25 | | 0.5 | | −0.25 | |
| $V_{in}$ | 5 | | 6 | | 7 | | 8 | | 9 | |
| $V_o$ | 5 | 5 | 5 | 5 | 10 | 5 | 5 | 10 | 10 | 5 |
|       | 5 | 5 | 5 | 10 | 5 | 10 | 10 | 5 | 10 | 10 |
| $V_{ave}$ | 5 | | 6.25 | | 7.5 | | 7.5 | | 8.75 | |
| $V_{err}$ | 0 | | 0.25 | | 0.5 | | −.05 | | −.025 | |
| $V_{in}$ | 10 | | 11 | | 12 | | 13 | | 14 | | 15 | |
| $V_o$ | 10 | 10 | 10 | 10 | 10 | 15 | 15 | 10 | 15 | 10 | 15 | 15 |
|       | 10 | 10 | 15 | 10 | 15 | 10 | 10 | 15 | 15 | 15 | 15 | 15 |
| $V_{ave}$ | 10 | | 11.25 | | 12.5 | | 12.5 | | 13.75 | | 15 | |
| $V_{err}$ | 0 | | 0.25 | | 0.5 | | −0.5 | | −0.25 | | 0 | |

Utilizing the super-pixel technique for input pixel values a simple comparison can be made between the prior art as illustrated in Table 1 for an input value of 3 and the same input value as shown in Table 2. In this regard, the average of the super pixel for the input value of 3 is given by equation 2.

$$10/4=2.5 \quad \text{Equation 2}$$

In short then, the average error has been reduced from −3 to only −0.5.

In a like manner, when the average error value of this method is compared with the prior art as shown in Table I utilizing the traditional error diffusion method, we find a significant reduction as provided by equation 3.

$$4.25/16=0.266 \quad \text{Equation 3}$$

It should be understood by those skilled in the art that Table II is an illustrative example only. In this regard, in actuality the number of input values is often 256 (8-bits) and the number of levels may be 8 or higher. Showing such higher numbers in examples however, would be difficult. In summary, the super-pixel method of performing multi-level error diffusion dramatically decreases the average error values that must be diff-used.

While a particular embodiment of the present invention has been shown and described, it will be obvious to those skilled in the art that changes and modifications may be made without departing from this invention in its broader aspects, and therefore, the appended claims are to encompass within their scope all such changes and modifications as falling within the true spirit and scope of this invention.

I claim:

1. An error diffusion system, comprising:
   accessing means for retrieving a pixel data value expressed as a fixed bit color space value of at least 256 levels of intensity for each primary color in RGB color space;
   resolution conversion means for transforming said pixel data value into another fixed bit color space value in another color space; and
   color space conversion means for transforming said another fixed bit color space value of another color space into a super pixel cell, wherein individual ones of the cells are assigned available output values where the average of the values in said cells is selected to be as close as possible to said fixed bit color space value of another color space.

2. An error diffusion method, comprising:
   transforming a pixel data value expressed as a fixed bit color space value of at least 256 levels of intensity for each primary color in RGB color space into like another fixed bit color space value in another color space; and
   transforming said another fixed bit color space value of another color space into a super pixel cell, wherein individual ones of the cells are assigned available output values where the average of the values in said cells is selected to be as close as possible to said fixed bit color space value of another color space.

* * * * *

UNITED STATES PATENT AND TRADEMARK OFFICE
CERTIFICATE OF CORRECTION

PATENT NO. : 7,158,262 B2
APPLICATION NO. : 10/979690
DATED : January 2, 2007
INVENTOR(S) : Amir Doron It is certified that error appears in the above-identified patent and that said Letters Patent is hereby corrected as shown below:

On the face page, in field (56), under "U.S. Patent Documents", in column 2, line 1, above "5,243,443  A  9/1993  Eschbach" insert -- 5,109,282  4/1992  Peli --.

Signed and Sealed this

Eighteenth Day of November, 2008

JON W. DUDAS
*Director of the United States Patent and Trademark Office*